Patented Apr. 8, 1941

2,237,769

UNITED STATES PATENT OFFICE 2,237,769

VULCANIZATION OF RUBBER

Robert L. Sibley, Nitro, W. Va., assignor to Monsanto Chemical Company, St. Louis, Mo., a corporation of Delaware No Drawing. Application September 25, 1936, Serial No. 102,555

6 Claims. (Cl. 260—789)

The present invention relates to new vulcanization accelerators, to a process of vulcanizing rubber and to the new vulcanization products obtained with the aid of the said new vulcanization accelerators.

Broadly the new and preferred class of rubber vulcanization accelerators are obtained by reacting a mercapto-thiazole with the appropriate alkoxy, aryloxy, aralkoxy and alicycloxy substituted aliphatic acyl halides. More specifically the present invention resides in vulcanization accelerators and the use thereof possessing the structural formula of

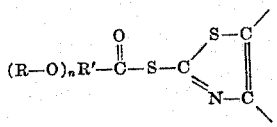

where R is a hydrocarbon radical, as for example an alkyl, aryl, aralkyl or alicyclic radical, R' is an aliphatic radical and $n$ is a whole number.

The preferred class of materials may be employed alone as accelerators, but are preferably employed in conjunction with other organic accelerators as activators thereof, and more particular in conjunction with organic nitrogen containing vulcanization accelerators as activators thereof, such for example as diphenyl guanidine, di ortho tolyl guanidine, hexamethylenetetramine, Schiff's bases, cyclohexylamine, guanidine salts, for example diphenyl guanidine phthalate, diphenyl guanidine acetate, diphenyl guanidine formate and analogues and equivalents thereof.

As typical examples of mercapto-thiazoles which are reactive with the oxy aliphatic acyl halides of this invention are 2-mercapto-4-methylthiazole, 2-mercapto-benzo-thiazole, 2-mercapto-naphtha-thiazole, 2-mercapto-6-nitro-benzo-thiazole, 2-mercapto-4-phenyl-benzo-thiazole, 2-mercapto-5-chlorbenzo-thiazole and 2-mercapto-4-methyl-benzo-thiazole and the analogues thereof.

As typical examples of oxy aliphatic acyl halides which are reactive with mercapto-thiazoles to produce the accelerators of the present invention are phenoxy acetyl chloride, ethoxy acetyl chloride, alpha phenoxy propionyl chloride, beta phenoxy propionyl chloride, diphenoxy acetyl chloride, triphenoxy acetyl chloride, butoxy acetyl chloride, alpha naphthoxy acetyl chloride, beta naphthoxy acetyl chloride, methyl phenoxy acetyl chloride and the analogues thereof.

The following specific examples are to be understood as illustrative embodiments of the invention and not in any sense limitative of the scope thereof.

EXAMPLE I 17.1 parts by weight of phenoxy acetyl chloride (substantially 0.1 mol), 16.7 parts by weight of mercapto-benzo-thiazole (substantially 0.1 mol) and an excess over an equivalent weight of anhydrous calcium carbonate together with substantially 250 parts by weight of a suitable inert anhydrous organic solvent, for example benzene, were placed in a suitable reactor, and the mixture refluxed with accompanying agitation for a convenient period of time, for example 24 hours. On the completion of the heating step, the solution was filtered, the filtrate extracted with dilute aqueous caustic soda solution to remove any unreacted mercapto-benzo-thiazole, washed with water, dried and the solvent removed by a convenient and suitable means. The solid, so obtained, was incorporated in the well-known way into a rubber stock comprising

| | Parts |
|---|---|
| Pale crepe rubber | 100 |
| Zinc oxide | 5 |
| Sulfur | 3 |
| Stearic acid | 1 |
| Reaction product of substantially equi-molecular proportions of phenoxy acetyl chloride and mercapto-benzo-thiazole | 1 |

The rubber stock so obtained was vulcanized by heating for different periods of time at the temperature of 30 pounds of steam pressure per square inch. The tests on the cured rubber product follow in Table I.

Table I

| Cure time in minutes | Modulus of elasticity in lbs./in.² at elongations of— | | | Tensile at break in lbs./in.² | Ultimate elongation, percent |
|---|---|---|---|---|---|
| | 300% | 500% | 700% | | |
| 30 | 113 | 211 | 670 | 1710 | 860 |
| 45 | 141 | 301 | 1018 | 2310 | 830 |
| 60 | 199 | 382 | 1275 | 2790 | 835 |

The data set forth above show that the new and preferred class of accelerators, for example the reaction product obtainable by reacting substantially equi-molecular proportions of mercapto-benzo-thiazole and phenoxy acetyl chloride, possess desirable accelerating properties. Moreover, the above uncured stock showed no "set up" or prevulcanization as determined by the Williams Plastometer described by Williams, Industrial and Engineering Chemistry for 1924 (vol. 16, page 362—see also Krall, ibid, vol. 16, page 922) on heating for 360 minutes at 200° F.

As a specific example of the use of organic nitrogen containing accelerators in conjunction with the new accelerators of the present invention, a rubber stock was compounded comprising

|  | Parts |
|---|---|
| Pale crepe rubber | 100 |
| Zinc oxide | 5 |
| Sulfur | 3 |
| Stearic acid | 1 |
| Reaction product of substantially equi-molecular proportions of mercapto-benzo-thiazole and phenoxy acetyl chloride | 0.8 |
| Diphenyl guanidine | 0.2 |

The compounded rubber stock was vulcanized by heating for thirty minutes at the temperature of 30 pounds of steam pressure per square inch. The tensile and modulus figures obtained on the cured rubber product follow in Table II.

Table II

| Modulus of elasticity in lbs./in.$^2$ at elongations of— | | | Tensile at break in lbs./in.$^2$ | Ultimate elongation, percent |
|---|---|---|---|---|
| 300% | 500% | 700% | | |
| 287 | 709 | 2,945 | 3,770 | 740 |

As further specific examples illustrative of the accelerators of this invention are (A) reaction product of ethoxy acetyl chloride and mercapto-benzo-thiazole, and (B) reaction product of alpha phenoxy propionyl chloride and mercapto-benzo-thiazole. Accelerators (A) and (B) were prepared in a manner analogous to that employed in the preparation of the reaction product of phenoxy acetyl chloride and mercapto-benzo-thiazole described above. Said accelerators, comprising an oil and a solid respectively, were milled in rubber stocks comprising

|  | Stock A | Stock B | Stock C | Stock D |
|---|---|---|---|---|
| Pale crepe rubber | 100 | 100 | 100 | 100 |
| Zinc oxide | 5 | 5 | 5 | 5 |
| Sulfur | 3 | 3 | 3 | 3 |
| Stearic acid | 0.5 | 0.5 | 0.5 | 0.5 |
| Accelerator (A) | 0.75 | | 0.6 | |
| Accelerator (B) | | 0.75 | | 0.5 |
| Diphenyl guanidine | | | 0.15 | 0.15 |

The stocks so compounded were vulcanized by heating in a press in the well-known manner for varying periods of time at the temperature of 20 pounds of steam pressure per square inch. The modulus and tensile properties obtained on the vulcanized rubber product are given in Table III.

Table III

| Stock | Cure time in minutes | Modulus of elasticity in lbs./in.$^2$ at elongations of— | | Tensile at break in lbs./in.$^2$ | Ultimate elongation, percent |
|---|---|---|---|---|---|
| | | 500% | 700% | | |
| A | 30 | 59 | 148 | 1273 | 1070 |
| B | 30 | 47 | 78 | 280 | 1000 |
| C | 30 | 194 | 816 | 2375 | 880 |
| D | 30 | 171 | 428 | 1925 | 915 |
| A | 45 | 115 | 361 | 1605 | 955 |
| B | 45 | 85 | 182 | 970 | 1000 |
| C | 45 | 265 | 1260 | 2825 | 815 |
| D | 45 | 236 | 995 | 2400 | 845 |
| A | 60 | 145 | 581 | 1880 | 885 |
| B | 60 | 125 | 313 | 1350 | 960 |
| C | 60 | 395 | 1840 | 3090 | 785 |
| D | 60 | 319 | 1270 | 2860 | 830 |
| A | 90 | 178 | 788 | 2190 | 875 |
| B | 90 | 144 | 503 | 2080 | 930 |
| C | 90 | 447 | 2610 | 3520 | 780 |
| D | 90 | 384 | 1585 | 3025 | 815 |

Unvulcanized rubber stocks containing the reaction products of ethoxy acetyl chloride and mercapto-benzo-thiazole and alpha phenoxy propionyl chloride and mercapto-benzo-thiazole respectively, on testing in the plastometer, exhibited the non-scorching properties typical of the preferred class of compounds.

From the data hereinbefore set forth it is shown that the preferred class of materials constitute an important class of rubber vulcanization accelerators, particularly when employed in conjunction with a nitrogen containing accelerator as an activator thereof.

The present invention is not limited to the specific examples hereinbefore set forth wherein the preferred accelerators are employed. Other ratios of the compounded ingredients than those mentioned in the examples, as well as other well-known fillers, pigments and the like may be employed in the production of various types of rubber compounds, and are apparent to those skilled in the art to which this invention pertains. The present invention is limited solely by the following claims.

What is claimed is:

1. The process of vulcanizing rubber which comprises heating rubber and sulfur in the presence of a benzothiazyl thio aryloxy-acetate admixed with a guanidine accelerator as an activator thereof.

2. A vulcanized rubber product produced by heating rubber and sulfur in the presence of a benzothiazyl thio aryloxy-acetate admixed with a guanidine accelerator as an activator thereof.

3. The process of vulcanizing rubber which comprises heating rubber and sulfur in the presence of a benzothiazyl thio aryloxy-acetate admixed with an organic basic nitrogen containing accelerator as an activator thereof.

4. The process of vulcanizing rubber which comprises heating rubber and sulfur in the presence of benzothiazyl thio phenoxy-acetate admixed with a guanidine accelerator as an activator thereof.

5. The vulcanized rubber product produced by heating rubber and sulfur in the presence of a benzothiazyl thio aryloxy-acetate admixed with an organic basic nitrogen containing accelerator as an activator thereof.

6. The vulcanized rubber product produced by heating rubber and sulfur in the presence of benzothiazyl thio phenoxy-acetate admixed with a guanidine accelerator as an activator thereof.

ROBERT L. SIBLEY.